(12) United States Patent
Wehlen et al.

(10) Patent No.: US 12,126,240 B2
(45) Date of Patent: Oct. 22, 2024

(54) ELECTRIC MACHINE HAVING A PLASTIC BODY

(71) Applicant: ZF Friedrichshafen AG, Friedrichshafen (DE)

(72) Inventors: Timo Wehlen, Friedrichshafen (DE); Eckhardt Lübke, Friedrichshafen (DE); Andreas Hölscher, Uhldingen-Mühlhofen (DE); Martin Jelinewski, Nonnenhorn (DE); Manfred Till, Friedrichshafen (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 387 days.

(21) Appl. No.: 17/602,376

(22) PCT Filed: Mar. 4, 2020

(86) PCT No.: PCT/EP2020/055633
§ 371 (c)(1),
(2) Date: Oct. 8, 2021

(87) PCT Pub. No.: WO2020/216506
PCT Pub. Date: Oct. 29, 2020

(65) Prior Publication Data
US 2022/0166280 A1    May 26, 2022

(30) Foreign Application Priority Data

Apr. 23, 2019  (DE) .................. 10 2019 205 752.7

(51) Int. Cl.
*H02K 5/08* (2006.01)
*H02K 5/16* (2006.01)
(Continued)

(52) U.S. Cl.
CPC ............... *H02K 5/08* (2013.01); *H02K 5/163* (2013.01); *H02K 5/203* (2021.01); *H02K 9/223* (2021.01)

(58) Field of Classification Search
CPC ............ H02K 1/16; H02K 1/185; H02K 1/20; H02K 11/21; H02K 15/12; H02K 2213/03;
(Continued)

(56) References Cited

U.S. PATENT DOCUMENTS 6,360,981 B1    3/2002  Specht
10,020,706 B2   7/2018  Kobes et al.
(Continued)

FOREIGN PATENT DOCUMENTS

BE    521948 A    8/1953
DE    19626213 C2 *  9/1998  ............. H02K 11/33
(Continued)

OTHER PUBLICATIONS

DE-19626213-C2, Landgesselle (Year: 1998).*
(Continued)

*Primary Examiner* — Naishadh N Desai
(74) *Attorney, Agent, or Firm* — Dority & Manning, P.A.

(57) ABSTRACT

An electric machine includes a housing, a stator, a rotor arranged radially within the stator, and a plastic body fixing the stator relative to the housing. The plastic body is electrically insulating. Further, the plastic body radially surrounds an outside of at least one soft magnetic core of the stator and first and second winding overhangs of the stator, and axially surrounds an end face of the first winding overhangs and an end face of the second winding overhangs. Additionally, the plastic body defines at least one channel for accommodating a coolant, the at least one channel having a first portion extending circumferentially along at least 40% of the end face of the first winding overhangs, a second
(Continued)

portion extending along an outer circumferential surface of the stator, and a third portion extending circumferentially along at least 40% of the end face of the second winding overhangs.

16 Claims, 2 Drawing Sheets

(51) Int. Cl.
*H02K 5/20* (2006.01)
*H02K 9/22* (2006.01)

(58) Field of Classification Search
CPC .. H02K 3/38; H02K 5/04; H02K 5/08; H02K 5/15; H02K 5/163; H02K 5/203; H02K 5/225; H02K 5/24; H02K 9/223; H02K 5/20; H02K 9/19
See application file for complete search history.

(56) References Cited

U.S. PATENT DOCUMENTS

| | | | | |
|---|---|---|---|---|
| 2014/0167536 A1* | 6/2014 | Hyun | ............... | H02K 5/203 310/54 |
| 2015/0381010 A1* | 12/2015 | Kobes | ............... | H02K 1/04 29/598 |
| 2017/0346351 A1* | 11/2017 | Volbers | ............... | H02K 1/02 |
| 2018/0026493 A1 | 1/2018 | Jung et al. | | |
| 2021/0296954 A1 | 9/2021 | Hoerz et al. | | |

FOREIGN PATENT DOCUMENTS

| | | |
|---|---|---|
| DE | 19940034 A1 | 4/2001 |
| DE | 102008035896 A1 | 2/2010 |
| DE | 102013201758 A1 | 8/2014 |
| DE | 102017109486 A1 | 11/2018 |
| DE | 102017210778 A1 | 12/2018 |
| EP | 1841043 A1 | 10/2007 |
| EP | 2744084 A2 | 6/2014 |
| WO | WO 2013/037409 A1 | 3/2013 |
| WO | WO 2018/202235 A1 | 11/2018 |
| WO | WO 2018/211088 A1 | 11/2018 |
| WO | WO 2019/002289 A1 | 1/2019 |

OTHER PUBLICATIONS

International Search Report (English Translation) PCT/EP2020/055633, dated Jun. 18, 2020. (3 pages).
German Search Report DE 10 2019 205 752.7, dated Jan. 10, 2020. (14 pages).

* cited by examiner

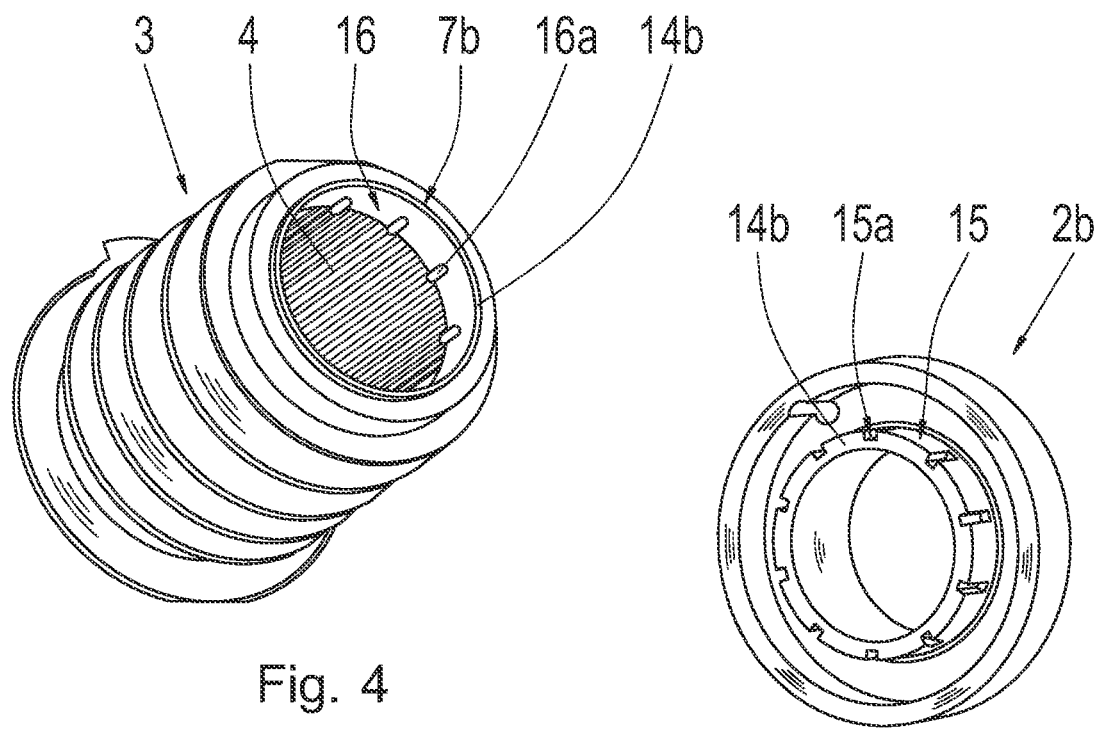
Fig. 4
Fig. 5
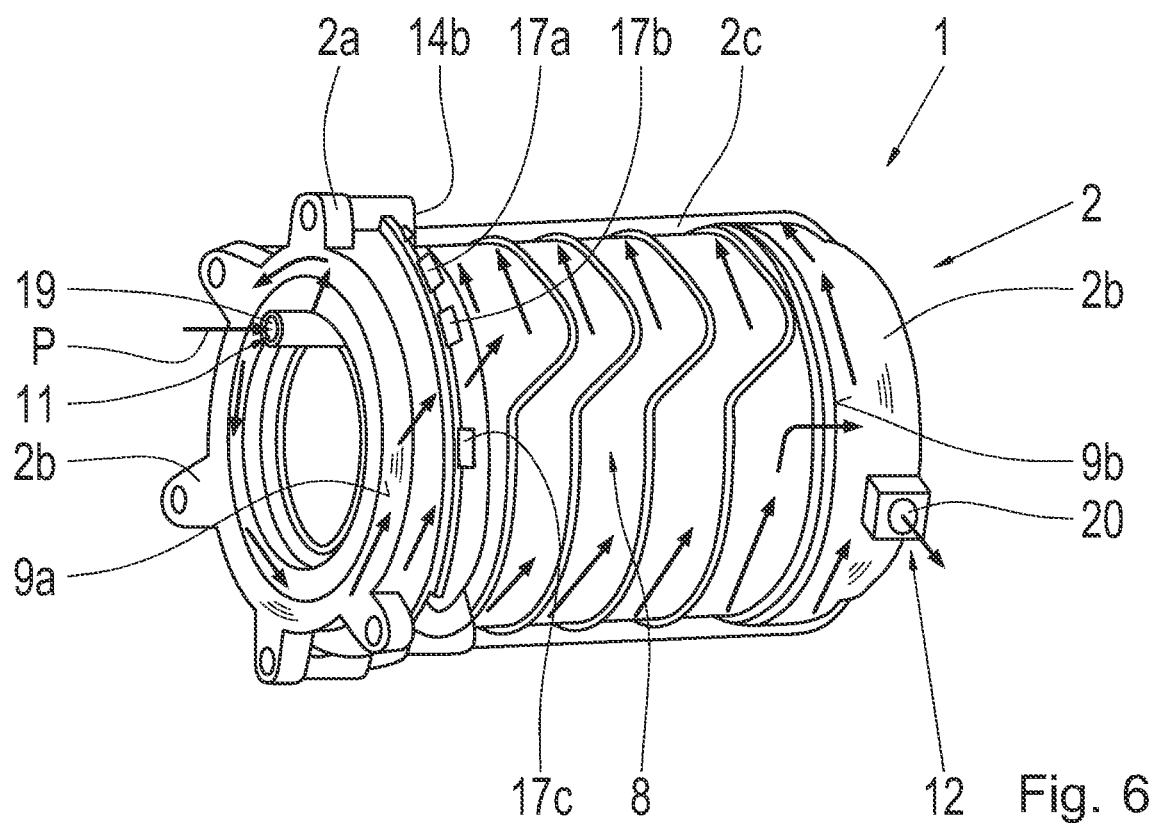
Fig. 6

ELECTRIC MACHINE HAVING A PLASTIC BODY

CROSS-REFERENCE TO RELATED APPLICATION

The present application is related and has right of priority to German Patent Application No. 10 2019 205 752.7 filed on Apr. 23, 2019 and is a nationalization of PCT/EP2020/055633 filed in the European Patent Office on Mar. 4, 2020, both of which are incorporated by reference in their entirety for all purposes.

FIELD OF THE INVENTION

The invention relates generally to an electric machine having a housing, a stator stationary or fixed at the housing by a plastic body, and a rotor arranged radially within the stator, wherein at least one channel is formed in the plastic body, the at least one channel accommodating a coolant.

BACKGROUND

DE 10 2013 201 758 A1 describes an electric machine having a housing and a stator accommodated at the housing, a rotor arranged radially within the stator, and a cooling device between the stator and the housing. At least one plastic body radially surrounds an outside of a soft magnetic core of the stator, wherein at least one indentation of the cooling device guiding a cooling medium is at least partially introduced in the outer lateral surface of the at least one plastic body.

SUMMARY OF THE INVENTION

The problem addressed by example aspects of the present invention is that of creating an electric machine having improved cooling.

An electric machine according to example aspects of the present invention includes a housing, a stationary stator accommodated at the housing by a plastic body, and a rotor arranged radially within the stator, wherein the plastic body is electrically insulating and radially surrounds an outside of at least one soft magnetic core of the stator as well as first and second winding overhangs of the stator at the end faces, wherein at least one channel for accommodating a coolant is formed in the plastic body. The at least one channel has a first portion formed circumferentially along at least 40% of a circular portion of the end face of the first winding overhangs. Furthermore, the at least one channel has a second portion formed along an outer circumferential surface of the stator. The at least one channel further has a third portion formed circumferentially along at least 40% of a circular portion of an end face of the second winding overhangs.

Consequently, at least the soft magnetic core and the first and second winding overhangs of the stator are encased by the plastic body radially outside and at the end faces. In particular, the winding overhangs are completely embedded in the plastic body. Therefore, the stator is preferably completely extrusion-coated with the plastic body except for an inner circumferential surface. The electrically insulating plastic body is preferably manufactured using an injection molding process or is made of a molding compound. The plastic body is configured for electrically insulating, sealing off, and cooling—by a coolant flow in the at least one channel—the electrically conductive components of the stator, and supporting the stator in the housing such that further stator carriers are obsolete.

The stator is formed from the soft magnetic core and windings and is configured for generating an electromagnetic field. The windings are formed, in particular, from copper wires and have winding overhangs at the ends, toward each end face of the stator, namely the first winding overhangs at the first end face, i.e., at a first axial end of the stator, and the second winding overhangs at the other end face, i.e., at a second axial end of the stator. The soft magnetic core of the stator is arranged axially between the first winding overhangs and the second winding overhangs.

For example, a single channel is formed in the plastic body, which extends from the first end of the stator to the second end of the stator. Alternatively, multiple channels are formed in the plastic body, which extend from the first end of the stator to the second end of the stator. The first portion of the at least one channel is formed circumferentially along at least 40% of the end face of the first winding overhangs. In other words, the first portion of the at least one channel at the end face of the first winding overhangs, which are formed at the first end of the stator, extends at least 144° about an essentially circular circumferential section. Preferably, the first portion of the at least one channel is formed circumferentially along at least 70% to 95% of the end face of the first winding overhangs, therefore about an angular range of between 252° and 342°.

Moreover, the second portion of the at least one channel is formed along an outer circumferential surface of the stator. For example, the second portion of the at least one channel is formed circumferentially along at least two 360° turns, i.e., by at least by 720°, of the outer circumferential surface of the stator. In particular, the second portion of the at least one channel is helically formed along the outer circumferential surface of the stator. Moreover, it is also conceivable, however, that the second portion of the at least one channel is meandering or curved. The second portion of the at least one channel also includes channel sections that are axial as well as parallel or is divided into at least two half-flows. A combination of the aforementioned channel configurations as well as further configurations are also conceivable.

Adjacent to the second channel section that is formed circumferentially about the outer circumferential surface of the stator is the third portion of the at least one channel that is formed circumferentially along at least 40% of the end face of the second winding overhangs. In other words, the third portion of the at least one channel at the end face of the second winding overhangs, which are formed at the second end of the stator, extends along at least 144° about an essentially circular circumferential section. Preferably, the third portion of the at least one channel is formed circumferentially along at least 70% to 95% of the end face of the second winding overhangs, i.e., along an angular range of between 252° and 342°.

Consequently, it is provided according to example aspects of the present invention to guide the coolant through the at least one channel at least partially circumferentially along the end face of the first winding overhangs, along the outer circumferential surface of the stator, and at least partially circumferentially along the end face of the second winding overhangs in order to efficiently cool at least the stator of the electric machine. It is essential to cool the first and second winding overhangs at least partially at the end faces in order to improve the cooling of the electric machine. Moreover, the configuration of the at least one channel, according to the invention, prevents the formation of dead water zones and enables an efficient coolant flow.

Due to the cooling of the winding overhangs at the end faces as well as radially on the outside at both ends of the stator and due to the radially outer cooling of the soft magnetic core, a large amount of waste heat is removed via the coolant and, as a result, the stator is efficiently cooled. As a result, the continuous input power of the electric machine is increased. A typical stator cooling jacket is not necessary, which reduces costs, weight, and installation space. Due to the plastic body, stator carriers are also dispensed with as the cooling of the stator is no longer dependent upon a pressing of the stator in a stator carrier. In particular, a noise decoupling between the stator and the housing takes place via the plastic body. Moreover, only a small amount of heat input takes place into a transmission oil of a transmission operatively connected to the electric machine, and so an oil-water heat exchanger is not necessary. In particular, the electric machine is provided for being connected, at an end face, to the transmission. Due to the cooling at both end faces of the electric machine, a cooling of a transmission wall of a transmission arranged at one end face of the electric machine also takes place.

Preferably, an inflow or inlet for the coolant is formed at the end face of the first winding overhangs, wherein an outflow or outlet for the coolant is formed at the end face of the second winding overhangs. At the inflow, the coolant has the lowest temperature and, thereby, the highest cooling power, because it has not yet absorbed any waste heat from the stator. In particular, the temperature at the first winding overhangs during the operation of the electric machine is higher than the temperature at the second winding overhangs, because at least one electrical feed line is arranged at the first winding overhangs, as the result of which more copper is installed in the area of the first winding overhangs.

The coolant is preferably water-based. An inflow connection geometry, for example, an inlet opening, and an outflow connection geometry, for example, an outlet opening, is radial or axial, in order to generate installation space advantages. An inflow for the coolant is understood to mean lines or geometries that make it possible for coolant to flow into the at least one channel. Moreover, an outflow for the coolant is understood to mean lines or geometries that make it possible for coolant to flow out of the at least one channel. Moreover, it is advantageous to arrange a transmission at the end face on the side of the outflow, wherein an oil-water heat exchanger abuts the outflow.

Preferably, an axial width of the at least one channel at the outer circumferential surface of the stator is at least three times as large as a radial depth of the at least one channel at the outer circumferential surface of the stator. Consequently, the at least one channel is wide and flat at the outer circumferential surface of the stator. For example, the axial width of the at least one channel at the outer circumferential surface of the stator is five times as large as the radial depth of the at least one channel at the outer circumferential surface of the stator. This improves, in particular, the cooling of the electric machine.

Moreover, the at least one channel is preferably an indentation in an outer surface of the plastic body and is configured for guiding the coolant between the housing and the plastic body. In particular example embodiments, the at least one channel includes an indentation defined in both end faces and in a lateral surface of the plastic body. For example, the indentations at the end faces of the plastic body are fluidically connected to each other by bore holes or recesses in the plastic body.

According to one preferred example embodiment of the invention, the plastic body is arranged, at the first winding overhangs, at least radially at or outside of a first axial ridge of the housing. Similarly, the plastic body is arranged, at the second winding overhangs, at least radially at or outside of a second axial ridge of the housing. Consequently, the housing has a first axial ridge and a second axial ridge, where each of the axial ridges is configured for accommodating the plastic body at least radially, optionally also axially, in the area of the particular winding overhangs. An axial ridge is to be understood to be a molding at the housing formed essentially completely circumferentially as well as axially in the direction of the stator.

Preferably, a first seal is arranged between the first axial ridge and the plastic body at the first winding overhangs, and a second seal is arranged between the second axial ridge and the plastic body at the second winding overhangs. In particular, each seal is accommodated at a groove at the housing provided therefor and sealingly comes to rest against the particular winding overhangs preferably radially at an inner circumferential surface of the plastic body. Each seal is arranged between the plastic body and the housing and is preferably an O-ring, in particular for delimiting and fluidically sealing the at least one channel.

Preferably, at least one of the two axial ridges is rotationally fixed to the plastic body at the particular winding overhangs in order to support the torque of the stator. Preferably, at least one of the two axial ridges is form-lockingly connected to the plastic body at the particular winding overhangs. In one example aspect, the second axial ridge is rotationally fixed to the plastic body at the second winding overhangs.

For example, an at least partially circumferential external toothing is formed at at least one of the two axial ridges, which is connected to a corresponding internal toothing of the plastic body at the particular winding overhangs. An external toothing is to be understood to be radially outwardly directed shaped elements. An internal toothing corresponding thereto includes recesses, which are corresponding to the outwardly directed shaped elements, and so the shaped elements of the external toothing form-lockingly engage into the recesses of the internal toothing. The external toothing includes at least two shaped elements. In particular, the external toothing includes a plurality of shaped elements, which are arranged adjacent to one another in the circumferential direction and form a completely circumferential toothing formed from teeth and tooth gaps arranged in alternation.

According to one preferred example embodiment of the invention, a bearing element is arranged proximate at least one of the two axial ridges. For example, the bearing element is arranged proximate at least one of the two axial ridges of the housing such that an at least partial cooling of the bearing element takes place by the coolant flowing in the plastic body. Moreover, it is conceivable to also cool further elements or components that develop heat during the operation of the electric machine and are arranged in close proximity to the housing, such as, for example, a housing-side speed sensor.

Preferably, the at least one channel is formed along at least one electrical line for conducting an electric current between a power electronics unit of the electric machine and the stator. In particular, the at least one channel is guided—at least partially or completely—along all electrical lines that are connected to the stator in order to cool the stator. Preferably, the at least one electrical line is a copper rail, a copper wire, or a flat copper component. In particular, the electric machine is a 3-phase motor (UVW motor) and is provided for use as a prime mover for a motor vehicle, so three electrical lines are provided with alternating current for operating the electric machine. A power electronics unit is understood to be a device that controls the operation, in particular the energization, of the stator by an open-loop system and a closed-loop system. In particular, the power electronics unit includes an inverter, which is configured for converting DC voltage into AC voltage.

Preferably, the plastic body has thermally conductive fillers. In particular, metallic fillers having a high thermal conductivity, for example, copper or aluminum particles, are arranged or included in the plastic body such that an electrical insulation of the plastic is maintained. Moreover, in some example embodiments, the plastic body is also furnished with ceramic particles, for example, with metal oxides, in order to increase the thermal conductivity.

According to one preferred example embodiment of the invention, the housing is in multiple pieces, where the housing includes at least one first housing cover and a housing shell section. The housing shell section is essentially a hollow cylinder and includes the first housing cover at an end face, wherein either an end-face section of the housing integrally connected to the housing shell section or a second housing cover of the housing is arranged at the other end face. In particular, the housing shell section is configured for completely accommodating the stator at least in the radial direction. The at least one first housing cover rests at least against the housing shell section in order to delimit the housing in the axial direction.

Preferably, one section of the plastic body is at least partially axially between the first housing cover and the housing shell section. A third seal and a fourth seal are arranged between the housing and the plastic body at the section of the plastic body at least partially axially between the first housing cover and the housing shell section. In particular, the third seal is arranged in a groove at the housing cover provided therefor and radially comes to rest against the plastic body. Preferably, the fourth seal is arranged in a groove at the plastic body provided therefor and radially comes to rest against the housing shell section. Each seal is arranged between the plastic body and the housing and is preferably an O-ring, in particular for delimiting and fluidically sealing the at least one channel.

BRIEF DESCRIPTION OF THE DRAWINGS

One preferred exemplary embodiment of the invention is explained in greater detail in the following with reference to the drawings, in which FIG. 4 shows a perspective schematic view of a stator of the electric machine according to the invention, surrounded by a plastic body, FIG. 5 shows a perspective schematic view of a second housing cover of the electric machine according to the invention, and FIG. 6 shows a perspective schematic view of the electric machine according to the invention.

DETAILED DESCRIPTION

Figure 1:
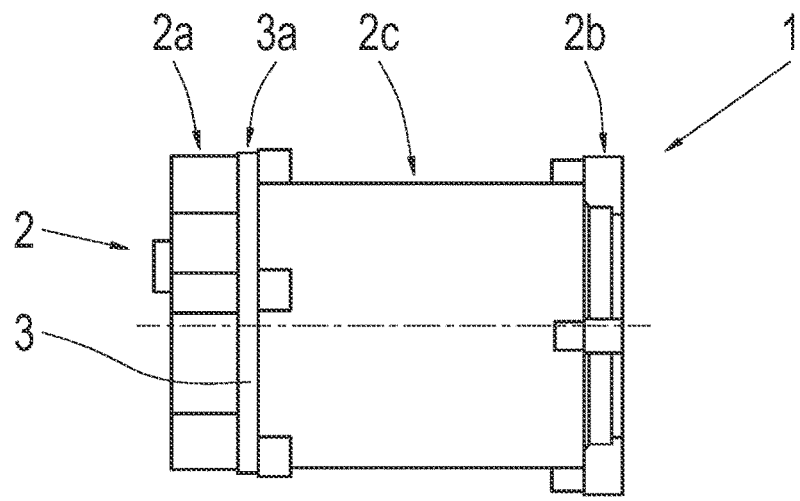
FIG. 1 shows a lateral or side schematic view of an electric machine according to the invention.

Reference will now be made to embodiments of the invention, one or more examples of which are shown in the drawings. Each embodiment is provided by way of explanation of the invention, and not as a limitation of the invention. For example, features illustrated or described as part of one embodiment can be combined with another embodiment to yield still another embodiment. It is intended that the present invention include these and other modifications and variations to the embodiments described herein.

According to FIG. 1, an electric machine 1 according to the invention includes a housing 2, which is formed as multiple pieces. Particularly, the housing 2 includes a first housing cover 2a, a second housing cover 2b, and a housing shell section 2c arranged axially between the first and second housing covers 2a, 2b. In the present case, the housing 2 is formed, in fact, as three pieces. Alternatively (although not represented here), in some example embodiments, the housing 2 also consists of the first housing cover 2a and the housing shell section 2c, wherein the second housing cover 2b is not a separate component of the housing 2, but rather is integrally connected to the housing shell section 2c. In other words, in such example embodiments, the housing shell section 2c is in the shape of a cup and has only one single end-face opening, which is closeable by the first housing cover 2a.

Figure 2:
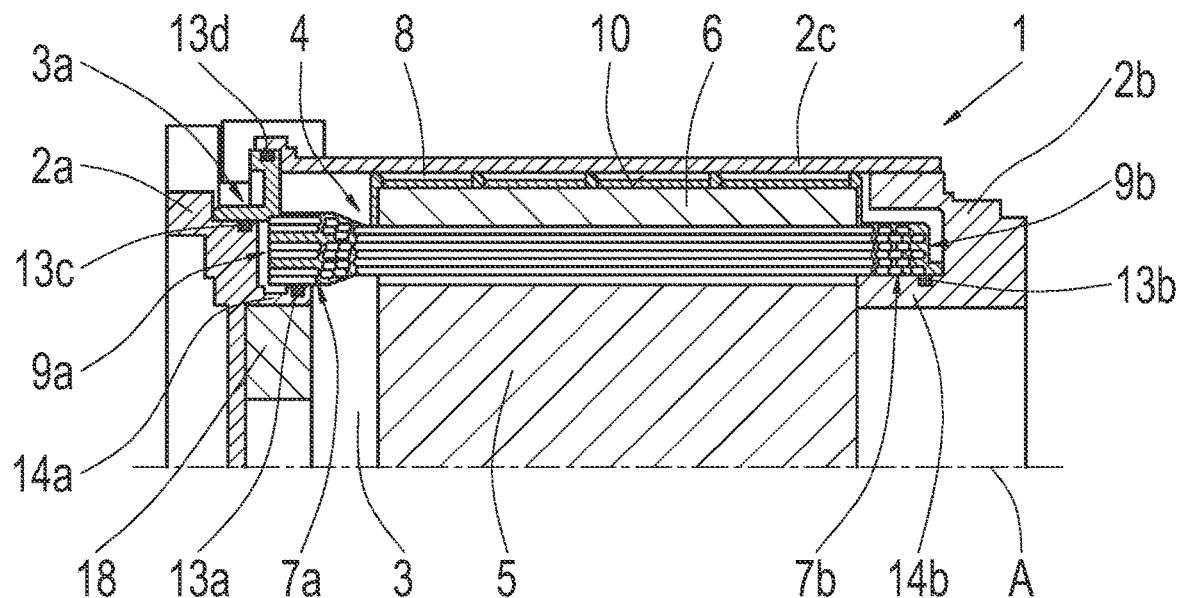
FIG. 2 shows a half-section schematic view of the electric machine according to the invention.

Moreover, a section 3a of a plastic body 3 is formed axially between the first housing cover 2a and the housing shell section 2c. According to FIG. 2, a stator 4, a rotor 5, which is arranged radially within the stator 4 and is rotatable about an axis of rotation A, and the electrically insulating plastic body 3 are arranged in the housing 2 of the electric machine 1, wherein the stator 4 is stationarily accommodated at or fixed to the housing 2 by the plastic body 3. A channel 8 is formed in the plastic body 3 for accommodating a flow of coolant through the channel in order to cool the stator 4. The plastic body 3 has thermally conductive fillers in order to increase its thermal conductivity.

The plastic body 3 surrounds a soft magnetic core 6 of the stator 4 on the end faces and radially on the outside. Moreover, the plastic body 3 also surrounds first and second winding overhangs 7a, 7b of the stator 4 radially and on the end faces. In the present case, the plastic body 3 is one piece formed by injection molding. Using the plastic body 3, the electrical parts of the stator 4 are electrically insulated and sealed with respect to the coolant, and simultaneously cooled via the coolant (not represented here) guided in the channel 8 formed in the plastic body 3. An axial width of the channel 8 at the outer circumferential surface 10 of the stator 4 is approximately six times as great as a radial depth of the channel 8 at the outer circumferential surface 10 of the stator 4. The channel 8 is formed as an indentation in an outer surface of the plastic body 3 and is configured for guiding the coolant between the housing 2 and the plastic body 3.

The plastic body 3 is arranged, in the area of the first winding overhangs 7a, radially at or outside of a first axial ridge 14a of the housing 2, with the first axial ridge 14a is formed integrally and circumferentially about the first housing cover 2a. Moreover, the plastic body 3 is arranged, in the area of the second winding overhangs 7b, radially at or outside of a second axial ridge 14b of the housing 2, wherein the second axial ridge 14b is formed integrally and circumferentially about the second housing cover 2b.

A first seal 13a is arranged in a groove at the first axial ridge 14a and forms a seal against the plastic body 3 in the area of the first winding overhangs 7a. A second seal 13b is arranged in a groove at the second axial ridge 14b and forms a seal against the plastic body 3 in the area of the second winding overhangs 7b. Moreover, a third seal 13c and a fourth seal 13d are arranged between the housing 2 and the plastic body 3, where the third seal 13c is arranged in a groove at the first housing cover 2a and forms a seal against the section 3a of the plastic body 3, and where the fourth seal 13d is arranged in a groove at the section 3a of the plastic body 3 and forms a seal against the housing shell section 2c. The third seal 13c and the fourth seal 13d are arranged at the section 3a of the plastic body 3 that is formed axially between the first housing cover 2a and the housing shell section 2c. The above-described arrangement of the seals 13a, 13b 13c, 13d and the arrangement of the section 3a of the plastic body 3 between the first housing cover 2a and the housing shell section 2c enable a simplified assembly of the electric machine 1 as well as a tolerance compensation in the axial direction, particularly during thermal expansions.

The second axial ridge 14b is rotationally fixed to the plastic body 3 in the area of the second winding overhangs 7b in order to support the torque of the stator 4. Moreover, a bearing element 18 is accommodated in the first housing cover 2a and is arranged at the first axial ridge 14a such that the bearing element 18 is cooled via a section of the channel 8 at the end face, along the first winding overhangs 7a.

Figure 3:
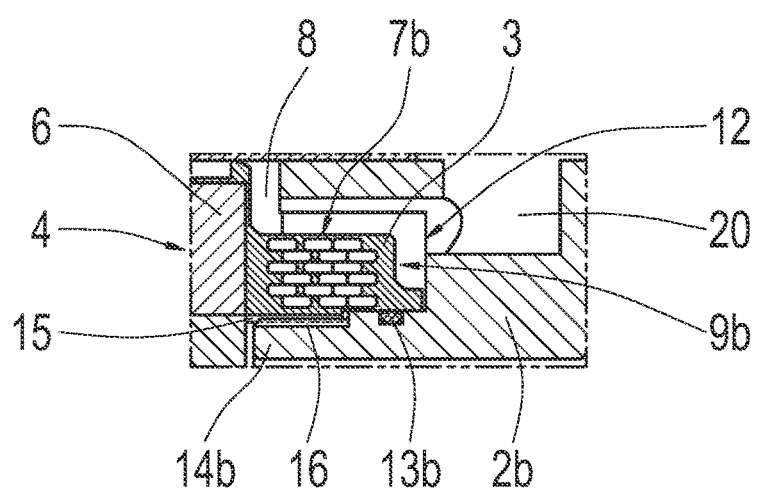
FIG. 3 shows a detailed schematic view of an area of the electric machine according to the invention.

FIG. 3 shows a detailed section view of the electric machine in the area of the second winding overhangs 7b of the stator 4. A circumferential external toothing 15 is formed at the second axial ridge 14b, which is connected to a corresponding internal toothing 16 at the plastic body 3 in the area of the second winding overhangs 7b.

FIG. 4 shows a perspective view of the stator 4 and the plastic body 3, particularly illustrating the internal toothing 16 at the plastic body 3 at the area of the second winding overhangs 7b. The internal toothing 16 at the plastic body 3 is formed in the area of the second winding overhangs 7b, i.e., at the second end of the plastic body 3. The internal toothing 16 consists of multiple radial raised areas 16a extending in the axial direction, the raised areas 16a form-lockingly engage into radial indentations 15a (FIG. 5) formed at the second housing cover 2b, where the radial indentations 15a also extend in the axial direction.

In FIG. 5, a perspective view of the second housing cover 2b is represented, showing the second axial ridge 14b at the second housing cover 2b. The second axial ridge 14b extends circumferentially and includes a circumferential external toothing 15, which includes the multiple indentations 15a that form-lockingly interact with the corresponding raised areas 16a of the internal toothing 16 of the plastic body 3 in the area of the second winding overhangs 7b. According to FIGS. 4 and 5, ten raised areas 16a and ten corresponding indentations 15a are provided for form-lockingly interacting with one another, wherein the second housing cover 2b is slid axially onto the plastic body 3. As a result, the second housing cover 2b is centered with respect to the plastic body 3.

In FIG. 6, a perspective view of the electric machine 1 is represented, with the housing shell section 2c being transparently represented, and with a coolant flow shown via arrows P in a simplified manner. In the present case, an inflow or inlet 11 for the coolant is formed at the end face 9a of the first winding overhangs 7a (not shown in FIG. 6), where the coolant flows into the housing 2 via an inlet opening 19 formed axially in the first housing cover 2a. An outflow or outlet 12 for the coolant is formed at the end face 9b of the second winding overhangs 7b (not shown in FIG. 6), where the coolant flows out of the housing 2 via an outlet opening 20 formed radially in the second housing cover 2b. The outflow 12 and the outlet opening 20 are also represented in the cutaway view in FIG. 3.

The channel 8 formed between the housing 2 and the plastic body 3 is utilized for the forced guidance of the coolant from the inlet opening 19 to the outlet opening 20. In the present case, the coolant is guided through the first portion of the channel 8 circumferentially along approximately 80% of the circular end face 9a of the first winding overhangs 7a. Particularly, the arrows P illustrate that the coolant flows into the channel 8 via the inlet opening 19 and is circumferentially guided approximately 290° along the circular end face 9a of the first winding overhangs 7a. Subsequent thereto, the coolant flows through a second, helical section of the channel 8 four times circumferentially along an outer circumferential surface 10 of the stator 4. Finally, the coolant flows through a third section of the channel 8 circumferentially along approximately 95% of the circular end face 9b of the second winding overhangs 7b and out of the channel 8 via the outlet opening 20. The temperature of the coolant at a minimum or lowest value in the area of the inflow 11 at the first winding overhangs 7a, wherein the temperature continuously increases as it flows through the channel 8 and reaches a maximum value in the area of the outflow 12 at the second winding overhangs 7b. Consequently, the first winding overhangs 7a are cooled to a greater extent than the second winding overhangs 7b. Moreover, three electrical lines 17a, 17b, 17c are positioned in the area of the first winding overhangs 7a, which are configured for conducting an electric current between a power electronics unit of the electric machine 1 and the stator 4. In the present case, the channel 8 is formed along the electrical lines 17a, 17b, 17c such that the electrical lines 17a, 17b, 17c are efficiently cooled by the coolant flow.

Modifications and variations can be made to the embodiments illustrated or described herein without departing from the scope and spirit of the invention as set forth in the appended claims. In the claims, reference characters corresponding to elements recited in the detailed description and the drawings may be recited. Such reference characters are enclosed within parentheses and are provided as an aid for reference to example embodiments described in the detailed description and the drawings. Such reference characters are provided for convenience only and have no effect on the scope of the claims. In particular, such reference characters are not intended to limit the claims to the particular example embodiments described in the detailed description and the drawings.

REFERENCE CHARACTERS 1 electric machine
2 housing
2a first housing cover
2b second housing cover
2c housing shell section
3 plastic body
3a section of the plastic body
4 stator
5 rotor
6 soft magnetic core
7a first winding overhangs
7b second winding overhangs
8 channel
9a end face of the first winding overhangs
9b end face of the second winding overhangs
10 outer circumferential surface
11 inflow
12 outflow
13a first seal 13b second seal
13c third seal
13d fourth seal
14a first axial ridge
14b second axial ridge
15 external toothing
15a indentation
16 internal toothing
16a raised area
17a electrical line
17b electrical line
17c electrical line
18 bearing element
19 inlet opening
20 outlet opening
A axis of rotation
P arrow

The invention claimed is:

1. An electric machine (1), comprising:
a housing (2);
a stator (4) fixed relative to the housing (2), the stator having at least one soft magnetic core (6), first winding overhangs (7a), and second winding overhangs (7b);
a rotor (5) arranged radially within the stator (4); and
a plastic body (3) fixing the stator (4) relative to the housing (2),
wherein the plastic body (3) is electrically insulating,
wherein the plastic body (3) radially surrounds an outside of the at least one soft magnetic core (6) of the stator (4) and the first and second winding overhangs (7a, 7b) of the stator (4) and axially surrounds an end face (9a) of the first winding overhangs (7a) and an end face (9b) of the second winding overhangs (7b), and
wherein the plastic body (3) defines at least one channel (8) for accommodating a coolant, the at least one channel (8) having a first portion extending circumferentially along at least forty percent of the end face (9a) of the first winding overhangs (7a), a second portion extending along an outer circumferential surface (10) of the stator (4), and a third portion extending circumferentially along at least forty percent of the end face (9b) of the second winding overhangs (7b).

2. The electric machine (1) of claim 1, wherein an inlet (11) for the coolant is at the end face (9a) of the first winding overhangs (7a), and wherein an outlet (12) for the coolant is at the end face (9b) of the second winding overhangs (7b).

3. The electric machine (1) of claim 1, wherein an axial width of the second portion of the at least one channel (8) along the outer circumferential surface (10) of the stator (4) is at least three times larger than a radial depth of the second portion of the at least one channel (8) at the outer circumferential surface (10) of the stator (4).

4. The electric machine (1) of claim 1, wherein the at least one channel (8) is an indentation in an outer surface of the plastic body (3) and is configured for guiding the coolant between the housing (2) and the plastic body (3).

5. The electric machine (1) of claim 1, wherein the plastic body (3) is at least radially outside of a first axial ridge (14a) of the housing (2) proximate the first winding overhangs (7a), and wherein the plastic body (3) is at least radially outside of a second axial ridge (14b) of the housing (2) proximate the second winding overhangs (7b).

6. The electric machine (1) of claim 5, further comprising:
a first seal (13a) between the first axial ridge (14a) and the plastic body (3); and
a second seal (13b) between the second axial ridge (14b) and the plastic body (3).

7. The electric machine (1) of claim 6, wherein one or both of the first axial ridge (14a) and the second axial ridge (14b) is rotationally fixed to the plastic body (3) to support torque of the stator (4).

8. The electric machine (1) of claim 7, wherein an external toothing (15) at least partially circumferentially extends around the housing (2) proximate one or both of the first axial ridge (14a) and the second axial ridge (14b), the external toothing (15) being engageable with an internal toothing (16) on the plastic body (3).

9. The electric machine (1) of claim 6, further comprising a bearing (18) proximate one or both of the first axial ridge (14a) and the second axial ridge (14b).

10. The electric machine (1) of claim 1, further comprising at least one electrical line (17a, 17b, 17c) for conducting an electric current to and from the stator (4), the at least one channel (8) extending along one or more of the at least one electrical line (17a, 17b, 17c).

11. The electric machine (1) of claim 1, wherein the plastic body (3) comprises thermally conductive fillers.

12. The electric machine (1) of claim 1, wherein the housing (2) has multiple pieces including at least one first housing cover (2a) and a housing shell section (2c).

13. The electric machine (1) of claim 12, further comprising:
a third seal (13c) and a fourth seal (13d), the third seal (13c) and the fourth seal (13d) being arranged between the housing (2) and the plastic body (3) at a section (3a) of the plastic body (3) that is at least partially axially between one of the at least one first housing cover (2a) and the housing shell section (2c).

14. The electric machine (1) of claim 1, wherein the second portion of the at least one channel (8) extends helically along the outer circumferential surface (10) of the stator (4).

15. The electric machine (1) of claim 1, wherein the end face (9a) of the first winding overhangs (7a) is a first axial end of the stator (4) and the end face (9b) of the second winding overhangs (7b) is a second axial end of the stator (4).

16. The electric machine (1) of claim 1, wherein the first portion of the at least one channel (8) extends axially outside the stator (4) and circumferentially along the at least forty percent of the end face (9a) of the first winding overhangs (7a), and the third portion of the at least one channel (8) extends axially outside the stator (4) and circumferentially along the at least forty percent of the end face (9b) of the second winding overhangs (7b).

* * * * *